United States Patent [19]

Frazier

[11] Patent Number: 4,534,775
[45] Date of Patent: Aug. 13, 1985

[54] AIR TREATMENT FILTER ELEMENT AND AIR TREATMENT FILTER

[75] Inventor: Stephen E. Frazier, Orlando, Fla.

[73] Assignee: General Time Corp., Norcross, Ga.

[21] Appl. No.: 601,946

[22] Filed: Apr. 19, 1984

Related U.S. Application Data

[63] Continuation of Ser. No. 354,030, Mar. 2, 1982, abandoned.

[51] Int. Cl.³ .............................................. B01D 53/04
[52] U.S. Cl. ............................................ 55/74; 55/75; 55/387; 55/389; 55/524; 422/122
[58] Field of Search ................. 55/73, 75, 279, 387, 55/389, 524, 74; 162/160, 161; 210/501, 502; 422/120, 122

[56] References Cited

U.S. PATENT DOCUMENTS

| | | | |
|---|---|---|---|
| 1,789,194 | 1/1931 | Rockwell | 422/122 X |
| 2,394,887 | 2/1946 | Berl | 422/122 X |
| 2,765,046 | 10/1956 | Rondholz | 55/279 X |
| 2,882,244 | 4/1959 | Milton | 55/75 X |
| 2,920,050 | 1/1960 | Blacet et al. | 422/122 X |
| 2,920,051 | 1/1960 | Wiiq et al. | 422/122 X |
| 3,029,581 | 4/1962 | Robbins | 55/316 |
| 3,049,399 | 8/1962 | Gamson et al. | 55/387 X |
| 3,116,969 | 1/1964 | Coleman, Jr. | 55/279 X |
| 3,138,432 | 6/1964 | Kleinhans | 422/122 |
| 3,200,569 | 8/1965 | Wheeler | 55/208 |
| 3,221,477 | 12/1965 | Arnoldi et al. | 55/31 |
| 3,226,332 | 12/1965 | Lincoln et al. | 252/184 |
| 3,325,402 | 6/1967 | Krskine | 210/501 X |
| 3,359,707 | 12/1967 | Jean | 55/33 |
| 3,381,454 | 5/1968 | Sponsel | 55/528 |
| 3,528,224 | 9/1970 | Warn | 55/179 |
| 3,555,787 | 1/1971 | Lustig | 55/179 |
| 3,557,534 | 1/1971 | Kennedy | 55/75 |
| 3,658,467 | 4/1972 | Maeck | 55/75 X |
| 3,683,596 | 8/1972 | Ashley | 55/389 X |
| 3,844,787 | 10/1974 | Macriss et al. | 55/75 X |
| 3,941,573 | 3/1976 | Chapel | 55/389 X |
| 4,012,206 | 3/1977 | Macriss et al. | 55/75 X |
| 4,021,577 | 5/1977 | Harich et al. | 424/195 |
| 4,146,566 | 3/1979 | Gaiser | 422/122 |
| 4,337,276 | 6/1982 | Nakamura et al. | 55/389 X |
| 4,343,765 | 8/1982 | Elston et al. | 422/122 X |

FOREIGN PATENT DOCUMENTS

109069 8/1979 Japan ................. 422/122

Primary Examiner—Robert Spitzer
Attorney, Agent, or Firm—Pennie & Edmonds

[57] ABSTRACT

An air treatment filter element is produced by contacting an adsorbent material selected from zeolite, activated carbon or a combination thereof with a liquid for inhibiting the growth of microorganisms. Additionally, the adsorbent material may include silica gel. Preferably, the liquid includes a fungicide/bacteriocide preservative composition in an amount from about 0.5 to 2% by weight of the liquid, at least one polyhydric alcohol, the polyhydric alcohol being present in an amount from about 83 to 99.5% by weight of the liquid, and at least one additional compound for modifying the vapor pressure of the polyhydric alcohol, the additional compound being present in an amount from about 0 to 15% by weight of the liquid. The amount of liquid used is from about 5 to 50%, most preferably 20 to about 30%, by weight of the combined weight of the liquid and adsorbent material.

40 Claims, 19 Drawing Figures

AIR TREATMENT FILTER ELEMENT AND AIR TREATMENT FILTER

This is a continuation of application Ser. No. 354,030, filed Mar. 2, 1982, now abandoned.

BACKGROUND OF THE INVENTION

The present invention relates to air treatment filter elements and air treatment filters. Specifically, the invention relates to air treatment filter elements and air treatment filters for removing odors and harmful gases from indoor air.

As is well-known, indoor air often contains numerous pollutants, including formaldehyde, acetic acid, ammonia, hydrogen sulfide, sulfur dioxide and solvent gases such as benzene and toluene. Recently, a great deal of attention has been given to formaldehyde pollution as a result of U.S. government studies linking formaldehyde to cancer. Further, indoor air often contains numerous odors, such as bathroom odors, kitchen odors, basement odors and tobacco odors.

In the past, air treatment systems have employed special liquids for removing odors and inhibiting the growth of micro-organisms, many of which are odor causing. While many air treatment systems have been effective to deodorize, such systems have lacked both high capacity and high efficiency for removing pollutants such as formaldehyde and solvent gases from air.

In attempting to increase the capacity and efficiency of air treatment systems for removing formaldehyde and solvent gases from indoor air, adding either activated carbon or zeolite (molecular sieves) to existing liquid containing air treatment systems has not been considered practical because it would be expected that contact of activated carbon and zeolite with a liquid for removing odors and inhibiting the growth of microorganisms would poison the gas adsorption properties of both the activated carbon and the zeolite. Specifically, it was believed that the activated carbon and zeolite would be preferentially saturated with the liquid and thereby rendered useless for adsorbing gases.

Consequently, it was believed necessary to redesign existing air treatment systems to contain separate compartments for the air treatment liquid and the activated carbon and zeolite so that no contact of the liquid with activated carbon and zeolite would occur. Obviously, the redesign of an existing system would be complicated, time consuming and expensive.

In accordance with the present invention, however, it has been found that the combination of certain air treatment liquids with activated carbon and zeolite does not destroy the gas adsorption properties of the activated carbon and zeolite. Totally unexpectedly, it has been discovered that not only does the liquid fail to poison the zeolite and activated carbon, but that the liquid-treated zeolite and activated carbon in fact adsorbed higher percentages of formaldehyde than untreated zeolite and activated carbon. Further, it was unexpectedly discovered that applying the liquid to the zeolite and activated carbon can even increase the odor and gas adsorbing lives of zeolite and activated carbon.

The present invention provides air treatment filter elements and air treatment filter systems having increased capacity and efficiency for adsorbing formaldehyde, hydrogen sulfide, sulfur dioxide, solvent gases and other harmful gases from air, particularly from indoor air. Furthermore, zeolite and activated carbon containing filter elements are provided in which the activated carbon and zeolite have enhanced abilities to adsorb formaldehyde and increased odor and gas adsorbing lives.

SUMMARY OF THE INVENTION

The present invention is directed to an air treatment filter element comprising an adsorbent material selected from the group consisting of zeolite, activated carbon and a combination thereof. The adsorbent material contains a liquid for inhibiting the growth of microorganisms. The liquid is present in an amount of from about 5 to about 50% by weight of the combined weight of the adsorbent and the liquid.

The present invention is also directed to an air treatment filter comprising a first layer comprising silica gel containing a liquid for inhibiting the growth of microorganisms. The liquid is present in an amount from about 5 to 50% by weight of the combined weight of the silica gel and the liquid. A second layer, adjacent to the first layer, comprises a combination of zeolite and activated carbon. The zeolite and activated carbon also contain a liquid for inhibiting the growth of microorganisms. The liquid is present in an amount from about 5 to about 50% by weight of the combined weight of the adsorbent materials and the liquid. The first and second layers are positioned between two other layers containing material for removing particulate matter from air.

The invention is also directed to an air treatment filter which includes first and third layers comprising plastic foam. A second layer, between the first and third layers, comprises a combination of silica gel, zeolite and activated carbon adsorbent materials containing a liquid for inhibiting the growth of microorganisms. The liquid is present in an amount from about 5 to about 50% by weight of the combined weight of the adsorbent materials.

The microorganism growth-inhibiting liquid comprises a fungicide/bacteriocide preservative composition in an amount from about 0.5 to 2% by weight of the liquid and from about 83 to 99.5% by weight of at least one polyhydric alcohol. The liquid also may contain from 0 to about 15% by weight of at least one compound for modifying the vapor pressure of the polyhydric alcohol.

The accompanying drawings, which are incorporated in and constitute a part of this specification, illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

In accordance with the invention, the air treatment filter element comprises an adsorbent material selected from the group consisting of zeolite, activated carbon and a combination thereof. A zeolite is a natural hydrated silicate of aluminum and either sodium or calcium or both, of the type $Na_2O.Al_2O_3.nSiO_2.xH_2O$. Molecular sieves belong to the class of minerals known as zeolites and the terms "molecular sieve" and "zeolite" are used interchangeably. Because of the scarcity of natural zeolites and the high degree of chemical and physical variability inherent in the use of natural zeolites, workers have succeeded in synthesizing many pure zeolite species.

Commercially available artificial zeolites (molecular sieves) are useful in the present invention for adsorbing harmful gases from air. Zeolite X is a preferred commercially available zeolite because it has pore sizes appropriate to adsorb harmful gases such as formaldehyde, sulfur dioxide, hydrogen sulfide, benzene and toluene. Zeolite X is described in detail in U.S. Pat. No. 2,882,244, the disclosure of which is specifically incorporated herein by reference. A specifically preferred synthetic type X zeolite is 13-X, which is available commercially from the Linde Division of Union Carbide Corporation.

Activated carbon, a well-known commercially available material, is an amorphous form of carbon characterized by high adsorptivity for many gases, vapors and colloidal solids. Any commercially available type of activated carbon is useful in the present invention.

In accordance with the invention, the adsorbent material may also include silica gel, a regenerative adsorbent consisting of amorphous silica. Silica gel is readily available commercially.

In accordance with the invention, the adsorbent material contains a liquid for inhibiting the growth of microorganisms. Those of ordinary skill in the art are well acquainted with liquids for inhibiting the growth of microorganisms. Preferred liquids include those having properties such as odor adsorption, low vapor pressure, low irritation levels, low toxicity, more preferably, no toxicity, low chemical reactivity and high chemical stability. The liquid inhibits the growth of microorganisms in the filter and assists in deodorizing.

In accordance with the invention, a preferred liquid comprises a fungicide/bacteriocide preservative composition in an amount from about 0.5 to 2% by weight of the liquid, at least one polyhydric alcohol, the polyhydric alcohol being present in an amount from about 83 to 99.5% by weight of the liquid, and at least one additional compound for modifying the vapor pressure of the polyhydric alcohol, the additional compound being present in an amount from about 0 to 15% by weight of the liquid.

The fungicide/bacteriocide preservative composition is selected to prevent the growth of fungi and bacteria within the filter element itself. Preferred fungicide/bacteriocide preservative compositions include captan, quaternary ammonium cosmetic preservatives, parabens and iodophors.

Specifically preferred is captan (N-trichloromethylthio-4-cyclohexene-1,2-dicarboximide, also known as N-trichloromethylthio-tetrahydrophthalimide) which has a molecular formula of $C_2H_8O_2NSCl_3$. A highly purified grade of captan is available from the R. T. Vanderbilt Company, Inc., 230 Park Avenue, New York, N.Y. 10017. This highly purified grade of captan, available in the form of a fine powder, has a Specific Gravity (average) of 1.7, a white to off-white color and a melting range of 171°–176° C.

Preferably, the fungicide/bacteriocide preservative composition is present in an amount of about 1% by weight of the liquid.

As defined herein, a polyhydric alcohol contains two or more hydroxyl groups. Included within this definition are compounds generally referred to as glycols, polyols and polyglycols.

A particularly preferred polyhydric alcohol is propylene glycol, which is defined herein to include 1,2-propylene glycol, 1,3-propylene glycol and a combination thereof. Further examples of suitable polyhydric alcohols include ethylene glycol, glycerin, polyethylene glycol, tripropylene glycol, dipropylene glycol and other high boiling glycol ethers. Preferably, the polyhydric alcohol is non-toxic.

A preferred combination of polyhydric alcohol is propylene glycol and glycerin. Preferably, the propylene glycol is present in an amount from about 74 to 89% by weight of the liquid and the glycerin is present in an amount from about 5 to 10% by weight of the liquid. Most preferably, the glycerin is present in an amount of about 8.5% by weight of the liquid and the propylene glycol is present in an amount of about 80.5% by weight of the liquid.

An additional compound may be added to the liquid to modify the vapor pressure of the polyhydric alcohol and thus retard the evaporation of the polyhydric alcohol. It is well-known that the vapor pressure of a liquid mixture having two ingredients is lower than the vapor pressure of the individual ingredients. Consequently, a combination of polyhydric alcohols modifies the vapor pressure of each polyhydric alcohol in the combination.

Thus, if vapor pressure lowering is desired, a combination of polyhydric alcohols may be used and no additional compound need be added. If, however, only one polyhydric alcohol is used, or if a combination is used, but in either case the vapor pressure is not low enough, an additional compound may be used to lower the vapor pressure or desired.

Those of ordinary skill in the art will readily be able to determine, without undue experimentation, suitable additional compounds for modifying the vapor pressure of the polyhydric alcohols. Preferably, the additional compound is water.

Preferably, the additional compound for modifying the vapor pressure of the polyhydric alcohol is present in the liquid in an amount of from about 5 to about 15% by weight based on the weight of the liquid. Preferably, the additional compound is water present in an amount of about 10% by weight of the liquid.

The liquid may also include other ingredients, such as perfumes, essential oils and the like for imparting a pleasant odor or a medicinal effect to the treated air. In certain applications, it may be desirable to include an easily vaporized insecticide.

In accordance with the invention, the liquid may further include an oxidizing agent. A preferred oxidizing agent is a naringen-iron chelate produced from the reaction of naringen in an amount from about 0.1 to 0.2% by weight of the liquid with an iron salt in an amount of from about 0.01 to 0.10% by weight of the liquid.

Preferably, the iron salt is the commercially available form of ferric chloride hydrate. Preferably, the naringen-iron chelate is produced from the reaction of naringen in an amount of 0.175% by weight of the liquid with ferric chloric hydrate in an amount of 0.05% by weight of the liquid. A narigen-iron chelate may be effective to assist in removal from air of $H_2S$, a well known cause of unpleasant odors.

Other oxidizing agents that may be included in the liquid include potassium permanganate, potassium dichromate, etc. However, such oxidizing agents cannot be used with a polyhydric alcohol and thus are preferably included in a separate filter layer.

In accordance with the invention, the liquid for inhibiting the growth of microorganisms may comprise the product obtained by contacting grapefruit pulp with a non-toxic polyhydric alcohol to form a reaction product, and separating the reaction product from the pulp residue. The method for making this specific liquid is described in U.S. Pat. No. 4,021,577, the disclosure of which is specifically incorporated herein by reference.

In accordance with the invention, the liquid for inhibiting the growth of microorganisms is present in an amount of from about 5 to about 50% by weight of the combined weight of the adsorbent and the liquid. Based on an amount of liquid by weight of the combined weight of the adsorbent and liquid, preferably the liquid is present in an amount of at least about 20%, and no more than about 45% (more preferably no more than 40%). A particularly preferred range is an amount from about 20 to about 30%, although amounts of from about 30% to 50% also can be employed.

In accordance with the invention, the adsorbent material may comprise an intimate mixture of the zeolite and activated carbon or the zeolite and activated carbon may be distributed in at least two adjacent layers, one or more of the layers of the adsorbent material containing only zeolite and one or more of the layers of the adsorbent material containing only activated carbon.

Further, in accordance with the present invention the filter element may contain a layer of silica gel or at least one layer of adsorbent material may comprise a mixture of silica gel with zeolite and/or activated carbon. Thus, for example, zeolite, activated carbon and silica gel may all be intimately mixed and present in a single layer or the filter element may contain one or more layer containing only zeolite, one or more layers containing only activated carbon and one or more layers containing only silica gel.

Figure 1:
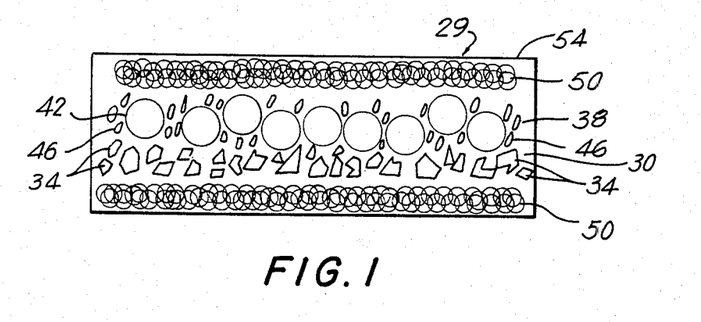
FIGS. 1–3 are cross-sectional views of air treatment filters constructed in accordance with the present invention.

In accordance with one embodiment of the invention, as shown in FIG. 1, an air treatment filter 29 comprises a first layer 30 comprising silica gel 34 containing the liquid (not shown) for inhibiting the growth of microorganisms. The liquid is present in the amounts previously described.

The filter also contains a second layer 38, adjacent to the first layer 30, comprising a combination of zeolite 42 and activated carbon 46. The zeolite and activated carbon contain the liquid (not shown) for inhibiting the growth of microorganisms in the amounts previously described.

Further, the first and second layers, 30 and 38 respectively, are positioned between two layers 50 containing material for removing particulate matter from air. Any suitable material for removing particulate matter from air may be used in the layers 50.

Preferably, in accordance with the invention, the two layers 50 containing material for removing particulate matter from air comprise plastic foam. More preferably, in accordance with the invention, the plastic foam is polyurethane containing 20 pores per inch. Other particular filters include natural and synthetic fiber materials, including paper, cellulose and Filtret®, a fiber filter mat manufactured by 3-M Company.

Further, the air treatment filter may be held within a structure 54. The structure 54 may comprise any suitable material for holding the filter and allowing air to pass through the air treatment filter. Preferably, the structure is made of plastic. More preferably, the plastic is polystyrene or polypropylene.

Figure 2:
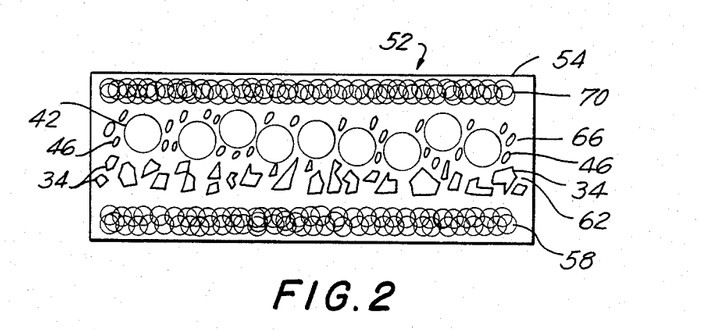

In accordance with the invention, as shown in FIG. 2, the air treatment filter 52 comprises a first layer 58 comprising plastic foam, a second layer 62, adjacent to the first layer and comprising silica gel containing the liquid for inhibiting the growth of microorganisms an amount of from about 5 to about 50% by weight of the combined weight of the silica gel and the liquid. Preferably, the liquid in the second layer is present in an amount of about 50% by weight of the combined weight of the liquid and the silica gel.

The air treatment filter contains a third layer 66, adjacent to the second layer 62, comprising a combination of zeolite and activated carbon. These adsorbent materials contain the liquid for inhibiting the growth of microorganisms, preferably in an amount of from about 30% by weight of the combined weight of the liquid, zeolite and activated carbon.

The filter contains a fourth layer 70, adjacent to the third layer 66, comprising plastic foam. The filter may be held within a structure 54, as described above.

Figure 3:
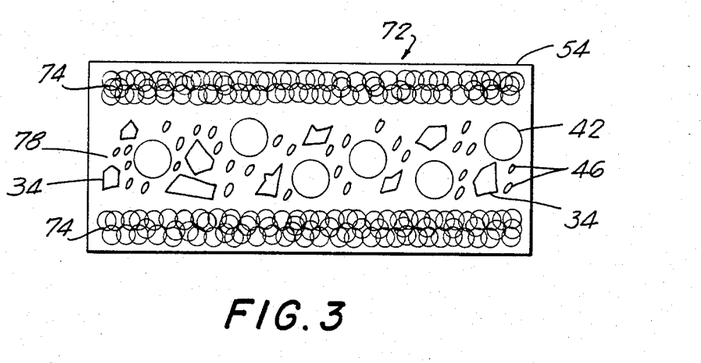

In accordance with another embodiment of the invention, as shown in FIG. 3, the air treatment filter 72 comprises first and third layers 74 comprising plastic foam and a second layer 78 comprising a combination of silica gel 34, zeolite 42 and activated carbon 46. Preferably, the silica gel, zeolite and activated carbon are intimately mixed. These adsorbent materials are impregnated with a suitable amount of the liquid for inhibiting the growth of microorganisms. The air treatment filter of this embodiment of the invention may be held within a structure 54, as described above.

The following example is designed to elucidate the teachings of the present invention, and in no way limits the scope of the invention. Various other modifications and equivalents of the example will readily suggest themselves to those of ordinary skill in the art, particularly after the issuance of this patent, without departing from the spirit or scope of the present invention.

EXAMPLE I

Experiment A

Four filters were prepared as follows. A bottom layer of plastic foam, comprising polyurethane having 20 pores per inch was covered with a layer of commercially available silica gel. The silica gel layer was covered with a layer of zeolite 13-X, a synthetic zeolite available from Linde Division, Union Carbide Corporation. The layer of zeolite was covered by a layer of plastic foam, comprising polyurethane having 20 pores per inch and the filter was placed within a polystyrene container. Three of the filters, hereinafter described as filters 2-4 respectively, were placed in separate air moving machines, and the machines were engaged, i.e., air was drawn through the machines.

Filter 1 was immediately placed in an air moving machine within a chamber to measure formaldehyde gas adsorption. Specifically, an 11.5 ft.³ chamber was utilized in combination with a Perkin Elmer Model 283 B infrared spectrophotometer equipped with a 20 meter folded gas cell. The formaldehyde gas in the chamber was pumped continuously through the gas cell at a rate of 10–11 liters/minute. The formaldehyde was generated in the chamber by evaporating paraformaldehyde.

Figure 4:
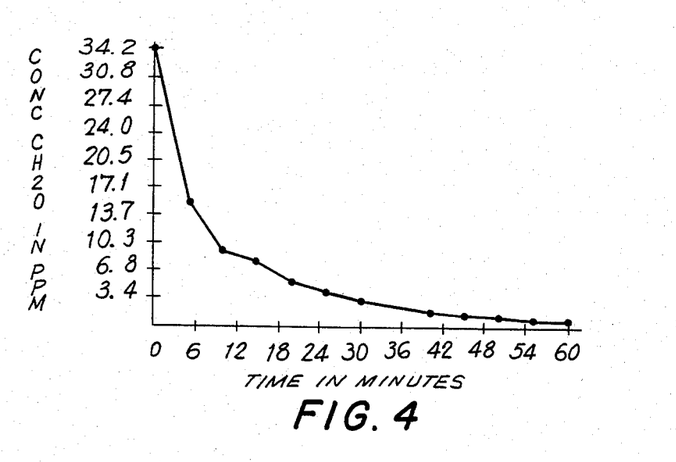
FIGS. 4–19 demonstrate, in graphical form, the results of formaldehyde adsorption tests conducted with untreated molecular sieves (zeolite), untreated activated carbon, molecular sieves (zeolite) treated with a liquid for inhibiting the growth of microorganisms and activated carbon treated with a liquid for inhibiting the growth of microorganisms.

The instrument was calibrated by evaporating known weights of the test material in the chamber and measuring the absorbance at the wavelength of a convenient absorbance maximum. Specifically, the concentration was measured at 2806 cm$^{-1}$. When a steady baseline was recorded, filter 1 was placed in an air moving machine within the chamber and the air moving machine was engaged. The recorder made a permanent record of concentration versus time for filter 1, graphically presented in FIG. 4, wherein time in minutes is measured on the abscissa and concentration of formaldehyde in ppm is measured on the ordinate.

Figure 5:
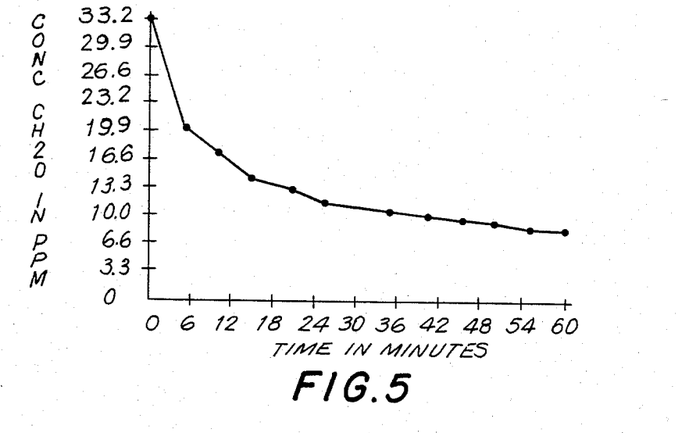

After filter 2 had run continuously for two weeks in the air moving machine, it was removed from the air-moving machine and placed in another air-moving machine in the above-described chamber and subjected to the same formaldehyde gas adsorption test. The results are shown graphically in FIG. 5.

Figure 6:
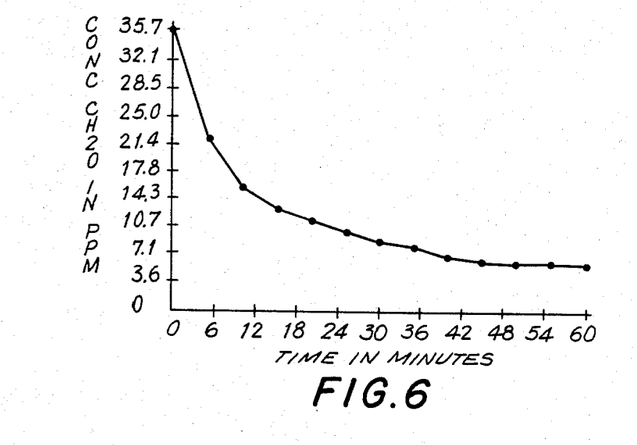

Filter 3 was run continuously for five weeks in the air-moving machine. The filter was removed from the air-moving machine, transferred to a different air-moving machine within the chamber and subjected to the gas adsorption test. The results are shown graphically in FIG. 6.

Figure 7:
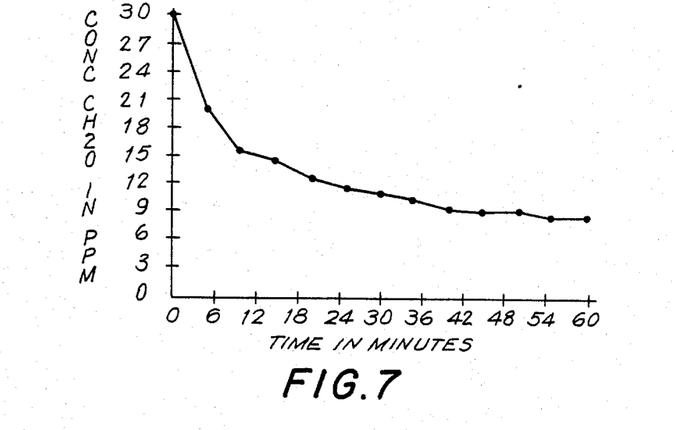

Filter 4 remained in a machine that ran continuously for six weeks. Filter 4 was then tested in a manner identical to the other three filters. The gas adsorption results are shown graphically in FIG. 7 and are presented numerically in Table I.

TABLE I

| TIME (MIN.) | ABSORBANCE | CONC (PPM) |
| --- | --- | --- |
| 0 | .192 | 30.0035372 |
| 5 | .137 | 19.6915129 |
| 10 | .113 | 15.5188342 |
| 15 | .106 | 14.3392414 |
| 20 | .096 | 12.6834389 |
| 25 | .089 | 11.544908 |
| 30 | .086 | 11.062142 |
| 35 | .082 | 10.4232848 |
| 40 | .076 | 9.47535077 |
| 45 | .075 | 9.31856945 |
| 50 | .074 | 9.16213319 |
| 55 | .071 | 8.69489475 |
| 60 | .07 | 8.53983872 |

Experiment B

Figure 8:
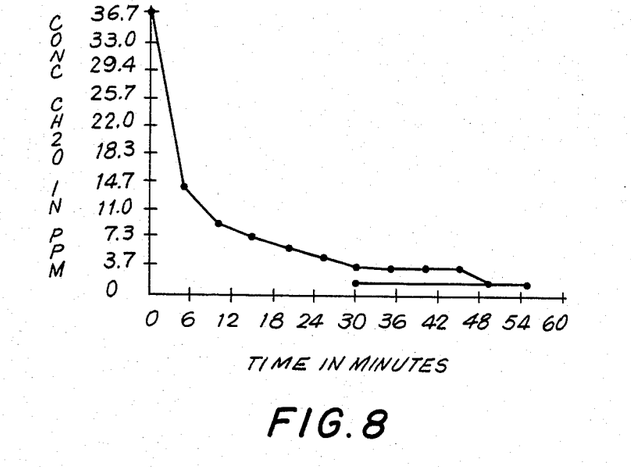

Four more filters, hereinafter described as filters 5–8 respectively, were prepared in the same manner as in Experiment A, except that the zeolite layer of Experiment A was substituted by a layer of activated carbon. Each of the filters was placed in a separate air-moving machine. The machine containing filter 5 was immediately tested as described in Experiment A. The results of the test are graphically shown in FIG. 8.

Figure 9:
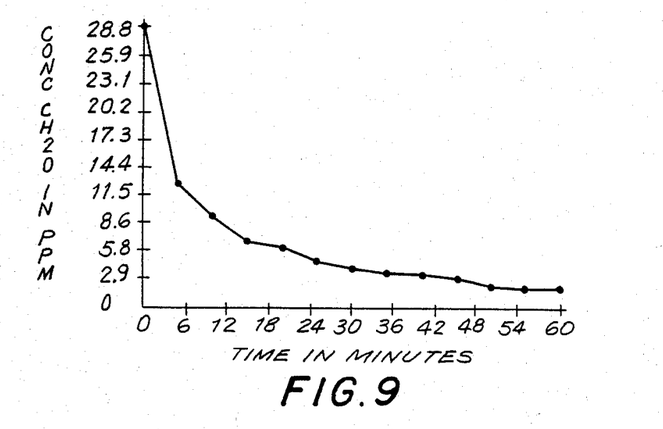

Filter 6 remained in a continuously operating air-moving machine for two weeks, whereupon it was subjected to the above-described formaldehyde gas adsorption test. The results are graphically shown in FIG. 9.

Figure 10:
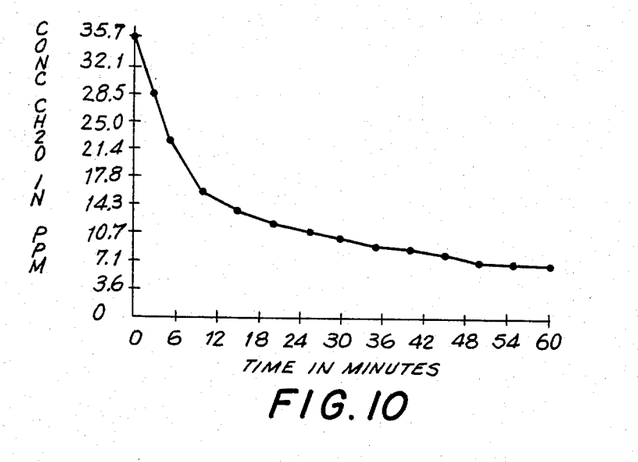

Filter 7 remained in a continuously oprating air-moving machine for five weeks, whereupon it was subjected to the above-described formaldehyde gas adsorption test. The results are graphically shown in FIG. 10.

Figure 11:
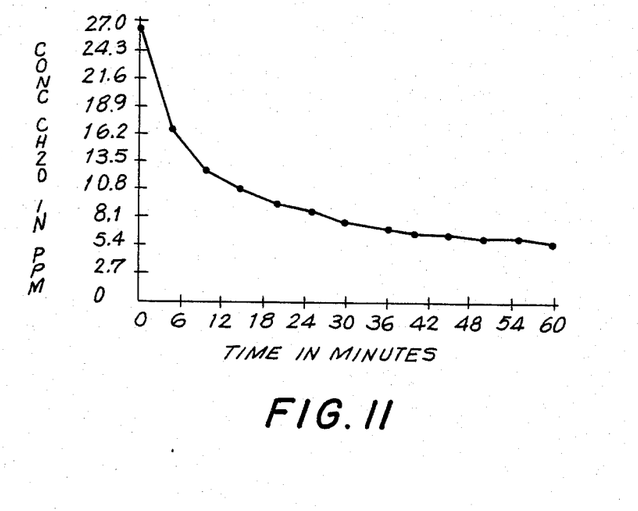

Filter 8 remained in an air-moving machine operating continuously for six weeks, whereupon it was subjected to the above-described gas adsorption test. The results of the test are graphically shown in FIG. 11 and are also numerically presented in Table II.

TABLE II

| TIME (MIN.) | ABSORBANCE | CONC (PPM) |
| --- | --- | --- |
| 0 | .173 | 26.3231922 |
| 5 | .119 | 16.5466708 |
| 10 | .096 | 12.6834389 |
| 15 | .085 | 10.9019101 |
| 20 | .076 | 9.47535077 |
| 25 | .071 | 8.69489475 |
| 30 | .064 | 7.61674872 |
| 35 | .06 | 7.00825652 |
| 40 | .057 | 6.55551045 |
| 45 | .055 | 6.25540503 |
| 50 | .053 | 5.95667984 |
| 55 | .053 | 5.95667984 |
| 60 | .051 | 5.65933486 |

Experiment C

Four filters, filters 9–12, identical to those in Experiment A, were prepared, except that the zeolite was treated with 30% by weight of the combined weight of the zeolite and the liquid of a liquid for inhibiting the growth of microorganisms. Specifically, the liquid comprised captan in an amount of about 1% by weight of the liquid, propylene glycol in an amount of about 80.5% by weight of the liquid, glycerin in an amount of about 8.5% of the liquid, water in an amount of about 10% by weight of the liquid and a naringen-iron chelate produced from the reaction of naringen in an amount of about 0.175% by weight of the liquid with ferric chloride hydrate in an amount of about 0.05% by weight of the liquid.

Figure 12:
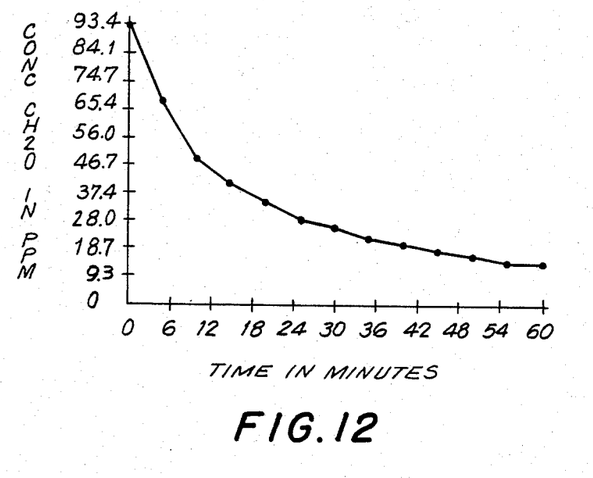

Each of filters 9–12 was placed in a separate air-moving machine. Filter 9 remained in a continuously running machine for one week and was thereafter tested in the same manner described in Experiment A. The results are graphically shown in FIG. 12.

Figure 13:
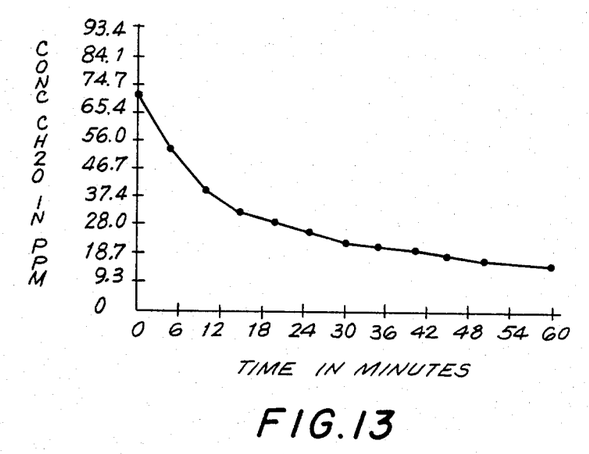

FIG. 10 remained in an air-moving machine operating continuously for two weeks and was then subjected to the test described in Experiment A. The results are graphically shown in FIG. 13.

Figure 14:
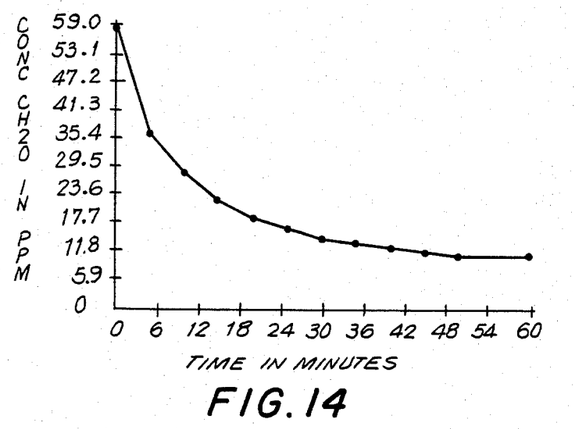

Filter 11 remained in an air-moving machine operated continuously for three weeks. The filter was then tested by the method described in Experiment A, and the results are graphically shown in FIG. 14.

Figure 15:
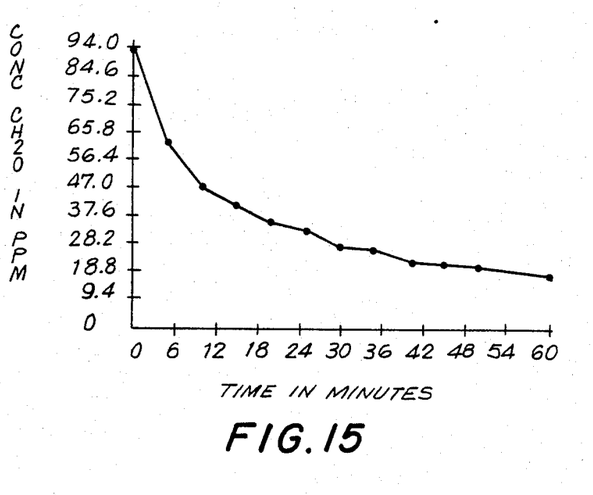

Filter 12 remained in a air-moving machine operated continuously for six weeks and was then tested in the same manner described above in Experiment A. The results are graphically shown in FIG. 15 and are also numerically presented in Table III.

TABLE III

| TIME (MIN.) | ABSORBANCE | CONC (PPM) |
| --- | --- | --- |
| 0 | .456 | 94.0308953 |
| 5 | .337 | 62.193103 |
| 10 | .276 | 47.7672507 |
| 15 | .244 | 40.7130347 |
| 20 | .218 | 35.241656? |
| 25 | .206 | 32.7950784 |
| 30 | .181 | 27.8576286 |
| 35 | .173 | 26.3231921 |
| 40 | .155 | 22.9514534 |
| 45 | .149 | 21.8523845 |
| 50 | .143 | 20.7657377 |
| 55 | .138 | 19.8696877 |
| 60 | .13 | 18.4539507 |

The results in Table III are to be compared with those obtained in Table I. In Table I, it is seen that the concentration (parts per million) of formaldehyde after 60 minutes, divided by the initial concentration of formaldehyde, equals 0.28. In other words, a reduction of 72% of the formaldehyde occurred in Experiment A.

In surprising contrast, the concentration (PPM) of formaldehyde at 60 minutes in Table III, divided by the initial concentration of formaldehyde, equals 0.20. In other words, the formaldehyde was reduced by 80% in Experiment C. Thus, not only does the application of the liquid for inhibiting the growth of microorganism to the zeolite fail to poison the gas adsorption ability of the zeolite, the gas adsorption ability of the zeolite is in fact increased by about 10%.

Experiment D

Four filters, 13–16, identical to those in Experiment B were prepared, except that the activated carbon was treated with 30% by weight of the combined weight of the absorbent and the liquid of the liquid described in Experiment C.

Figure 16:
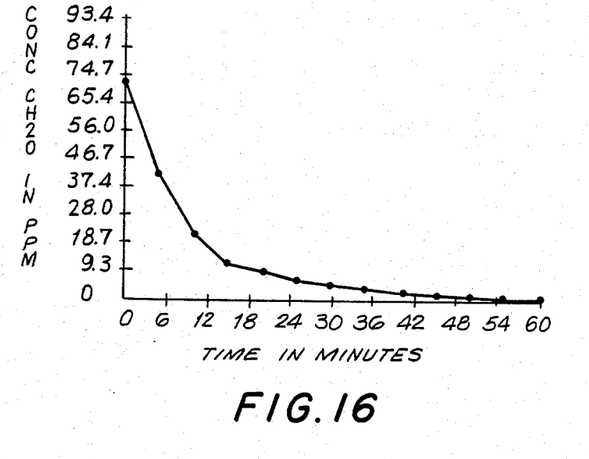

Filter 13 remained in a continuously operating air-moving machine for one week, whereupon it was tested as in Experiment A. The results are graphically shown in FIG. 16.

Figure 17:
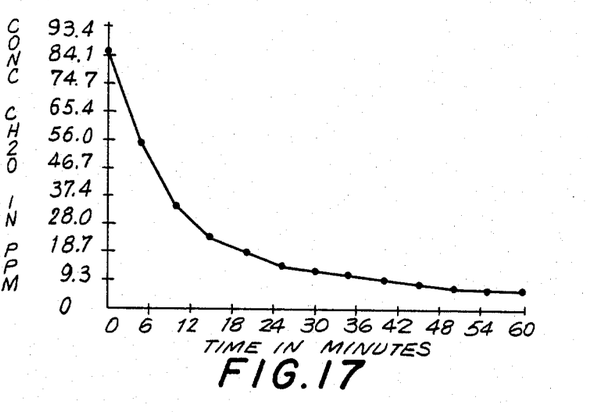

Filter 14 was exposed to air for two weeks, followed by testing in accordance with Experiment A. The results are graphically shown in FIG. 17.

Figure 18:
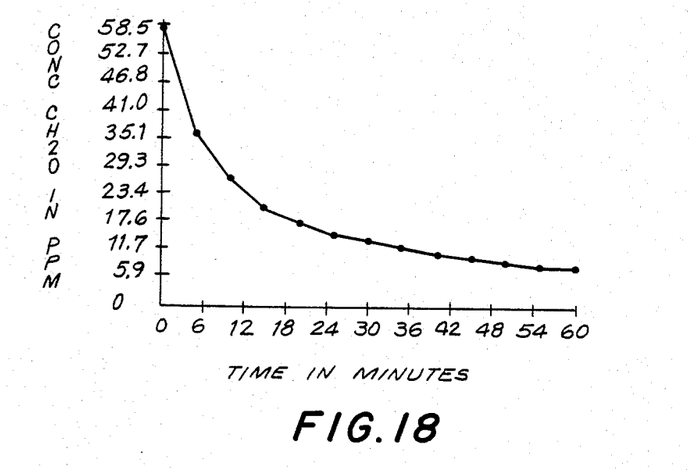

Filter 15 was continuously exposed to air for three weeks, followed by testing as in Experiment A for formaldehyde gas adsorption. The results are graphically shown in FIG. 18.

Figure 19:
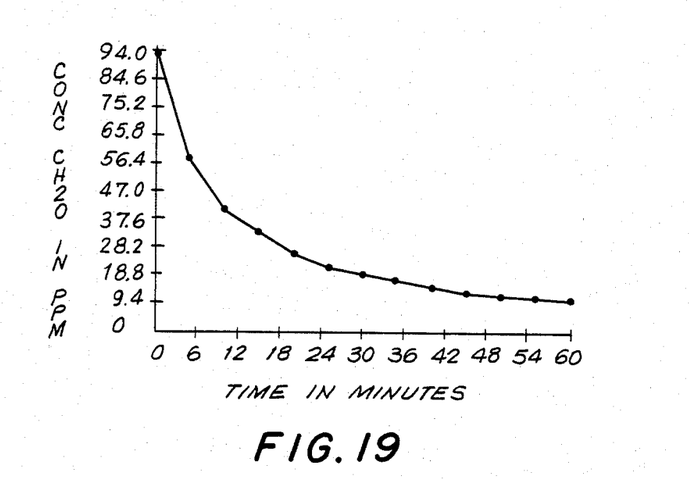

Filter 16 was continuously exposed to air for six weeks, followed by transfer and testing in accordance with Experiment A. The results are graphically shown in FIG. 19 and are also numerically presented in Table IV.

TABLE IV

| TIME (MIN.) | ABSORBANCE | CONC (PPM) |
|---|---|---|
| 0 | .456 | 94.0308953 |
| 5 | .321 | 58.2850525 |
| 10 | .246 | 41.1435715 |
| 15 | .208 | 33.1993909 |
| 20 | .175 | 26.7047309 |
| 25 | .152 | 22.4003662 |
| 30 | .136 | 19.5136832 |
| 35 | .125 | 17.5803295 |
| 40 | .113 | 15.5188342 |
| 45 | .105 | 14.1721085 |
| 50 | .097 | 12.8474664 |
| 55 | .091 | 11.8684773 |
| 60 | .089 | 11.544908 |

The results in Table IV are to be compared with those obtained in Table II. As seen in Table II, the concentration of formaldehyde at 60 minutes, divided by the initial concentration, equals 0.22. In other words, the reduction of formaldehyde gas in Experiment B was 78%. In contrast, the concentration of formaldehyde at 60 minutes in Table IV, divided by the initial concentration of formaldehyde, equals 0.13. In other words formaldehyde reduction is 87% in Experiment D. Unexpectedly, therefore, the application of the liquid for inhibiting the growth of microorganisms to the activated carbon not only failed to poison the formaldehyde gas adsorbing ability of the activated carbon but in fact increased the gas adsorbing ability of the activated carbon by about 10%.

I claim:

1. A method for removing odors and harmful gases from indoor air which comprises contacting the air, odors and harmful gases with an air treatment filter element, said element consisting essentially of at least one layer of an adsorbent material selected from the group consisting of zeolite, activated carbon, silica gel, and a combination thereof, said adsorbent material containing a liquid for inhibiting the growth of microorganisms, said liquid being present in an amount from about 5 to about 50% by weight of the combined weight of said adsorbent and said liquid;
said liquid comprising:
   (a) a fungicide/bacteriocide preservative composition in an amount from about 0.5 to 2% by weight of the liquid;
   (b) at least one polyhydric alcohol, said polyhydric alcohol being present in an amount from about 83 to 99.5% by weight of the liquid; and
   (c) at least one compound for modifying the vapor pressure of said polyhydric alcohol, said compound being present in an amount of less than about 15% by weight of the liquid.

2. The method according to claim 1 wherein said harmful gas is formaldehyde.

3. The method according to claim 1 wherein said absorbent material is distributed in at least two adjacent layers with at least one layer containing zeolite and at least one layer containing activated carbon.

4. A method for removing odors and gases from indoor air which comprises contacting the air, odors, and harmful gases with an air treatment filter element consisting essentially of at least one layer of an adsorbent material selected from the group consisting of zeolite, activated carbon, silica gel, and a combination thereof, said adsorbent material containing a liquid for inhibiting the growth of microorganisms, said liquid being present in an amount from about 5 to about 50% by weight of the combined weight of said adsorbent; said liquid comprising the product obtained by contacting grapefruit pulp with a non-toxic polyhydric alcohol to form a reaction product, and separating said reaction product from the pulp residue.

5. The method according to claim 4 wherein said harmful gas is formaldehyde.

6. A method for removing particulate matter, odors, and harmful gases from indoor air which comprises passing particulate matter, odors, harmful gases and air through an air filter comprising:
   (a) a structure for holding a filter element; and
   (b) a filter element consisting essentially of:
      (1) a first layer comprising silica gel containing a liquid for inhibiting the growth of microorganisms, said liquid being present in an amount from about 5 to about 50% by weight of the combined weight of said silica gel and said liquid; and
      (2) a second layer, said second layer being adjacent to said first layer and comprising a combination of zeolite and activated carbon, said zeolite and activated carbon containing a liquid for inhibiting the growth of microorganisms, said liquid for inhibiting the growth of microorganisms, said liquid being present in an amount from about 5 to about 50% by weight of the combined weight of said zeolite, activated carbon and liquid;
   said first and second layers being positioned between two layers containing material for removing particulate matter from the air, and said liquid of said first and second layers comprising:
(a) a fungicide/bacteriocide preservative composition in an amount from about 0.5 to 2% by weight of the liquid,
(b) at least one polyhydric alcohol, said polyhydric alcohol being present in an amount from about 83 to about 99.5% by weight of the liquid, and
(c) optionally, at least one compound for modifying the vapor pressure of said polyhydric alcohol, said compound being present in an amount of less than about 15% by weight of the liquid.

7. The method according to claim 6 wherein said harmful gas is formaldehyde.

8. A method for removing particulate matter, odors, and harmful gases from indoor air which comprises passing particulate matter, odors, harmful gases and air through an air filter comprising:
(a) a structure for holding a filter element; and
(b) a filter element consisting essentially of:
(1) a first layer comprising plastic foam;
(2) a second layer adjacent said first layer comprising silica gel containing a liquid for inhibiting the growth of microorganisms, said liquid comprising
  (i) a fungicide/bacteriocide preservative composition in an amount from about 0.5 to 2% by weight of the liquid,
  (ii) at least one polyhydric alcohol, said polyhydric alcohol being present in an amount from about 83 to about 99.5% by weight of the liquid,
  (iii) at least one compound for modifying the vapor pressure of said polyhydric alcohol, said compound being present in an amount of less than about 15% by weight of the liquid, and
  (iv) a naringen-iron chelate produced from the reaction of naringen in an amount from about 0.1 to 0.2% by weight of the liquid with ferric chloride hydrate in an amount from about 0.01 to 0.10% by weight of the liquid, said liquid being present in an amount from about 5 to about 50% by weight of the combined weight of said silica gel and said liquid;
(3) a third layer adjacent said second layer comprising a combination of zeolite and activated carbon, said zeolite and activated carbon containing a liquid for inhibiting the growth of microorganisms, said liquid comprising
  (i) a fungicide/bacteriocide preservative composition in an amount from about 0.5 to 2% by weight of the liquid,
  (ii) at least one polyhydric alcohol, said polyhydric alcohol being present in an amount about 83 to 99.5% by weight of the liquid,
  (iii) at least one compound for modifying the vapor pressure of said polyhydric alcohol, said compound being present in an amount of less than about 15% by weight of the liquid, and
  (iv) a naringen-iron chelate produced from the reaction of naringen in an amount from about 0.1 to 0.2% by weight of the liquid with ferric chloride hydrate in any amount from about 0.01 to 0.10% by weight of the liquid, said liquid being present in an amount from about 5 to about 50% by weight of the combined weight of said zeolite, activated carbon and liquid, and
(4) a fourth layer adjacent said third layer comprising plastic foam.

9. The method according to claim 8 wherein said harmful gas is formaldehyde.

10. A method for removing particulate matter, odors, and harmful gases from indoor air which comprises passing particulate matter, odors, harmful gases and air through an air filter comprising:
(a) a structure for holding a filter element; and
(b) a filter element consisting essentially of:
(1) first and third layers comprising plastic foam, and
(2) a second layer between said first and third layers comprising a combination of silica gel, zeolite and activated carbon, said silica gel, zeolite and activated carbon containing a liquid for inhibiting the growth of microorganisms, said liquid being present in an amount from about 5 to about 50% by weight of the combined weight of said silica gel, zeolite, activated carbon and liquid, said liquid comprising:
  (i) a fungicide/bacteriocide preservation composition in an amount from 0.5 to 2% by weight of the liquid,
  (ii) at least one polyhydric alcohol, said polyhydric alcohol being present in an amount from about 83 to 99.5% by weight of the liquid, and
  (iii) at least one compound for modifying the vapor pressure of said polyhydric alcohol, said compound being present in an amount of less than about 15% by weight of the liquid.

11. The method according to claim 10 wherein said harmful gas is formaldehyde.

12. An air treatment filter element consisting essentially of an adsorbent material selected from the group consisting of zeolite, activated carbon and a combination thereof, said adsorbent material containing a liquid for inhibiting the growth of microorganisms, said liquid comprising:
(a) a fungicide/bacteriocide preservative composition in an amount from 0.5 to 2% by weight of the liquid,
(b) at least one polyhydric alcohol, said polyhydric alcohol being present in an amount from about 83 to 99.5% by weight of the liquid, and
(c) at least one additional compound for modifying the vapor pressure of said polyhydric alcohol, said additional compound being present in an amount from about 0 to 15% by weight of the liquid, said liquid being present in an amount from about 5 to about 50% by weight of the combined weight of said adsorbent and said liquid.

13. The filter element of claim 12 wherein said zeolite is zeolite X.

14. The filter element of claim 13 wherein said fungicide/bacteriocide preservative composition is selected from the group consisting of:
(a) captan,
(b) quaternary ammonium cosmetic preservatives,
(c) parabens, and
(d) iodophors.

15. The filter element of claim 14 wherein said polyhydric alcohol is propylene glycol.

16. The filter element of claim 15 wherein said liquid further includes a naringen-iron chelate produced from the reaction of naringen in an amount from about 0.1 to 0.2% by weight of the liquid with an iron salt in an amount from about 0.01 to 0.10% by weight of the liquid.

17. The filter element of claim 16 wherein said iron salt is ferric chloride hydrate.

18. The filter element of claim 17 wherein said polyhydric alcohol is a combination of propylene glycol, glycerin and tripropylene glycol and further wherein said additional compound is water.

19. The filter element of claim 18, wherein said fungicide/bacteriocide preservative composition is present in an amount of about 1% by weight of said liquid.

20. The filter element of claim 19 further containing a separate layer comprising activated carbon and silica gel, said activated carbon containing a liquid for inhibiting the growth of microorganisms, wherein said liquid contains an oxidizing agent, said oxidizing agent being compatible with said liquid.

21. The filter element of claim 12, wherein said adsorbent material is activated carbon or a combination of zeolite and activated carbon, wherein said filter element further includes silica gel and wherein said liquid contains an oxidizing agent, said oxidizing agent being compatible with said liquid.

22. An air treatment filter element consisting essentially of an adsorbent material selected from the group consisting of zeolite, activated carbon and a combination thereof, said adsorbent material containing a liquid for inhibiting the growth of microorganisms, said liquid comprising the product obtained by contacting grapefruit pulp with a non-toxic polyhydric alcohol to form a reaction product, and separating said reaction product from the pulp residue, said liquid being present in an amount from about 5 to about 50% by weight of the combined weight of said adsorbent and said liquid.

23. The filter element of claim 22 wherein said adsorbent material further includes silica gel, said silica gel containing a liquid for inhibiting the growth of microorganisms.

24. The filter element of claim 23, wherein said adsorbent material is distributed in at least two adjacent layers.

25. The filter element of claim 24, wherein one of said layers of said adsorbent material contains zeolite and another of said layers of said adsorbent material contains activated carbon.

26. The filter element of claim 24, wherein at least one of said layers of adsorbent material comprises a material selected from the group consisting of zeolite, activated carbon, silica gel and a combination thereof.

27. An air treatment filter comprising:
(a) a structure for holding a filter element; and
(b) a filter element consisting essentially of:
(1) a first layer comprising silica gel containing a liquid for inhibiting the growth of microorganisms, said liquid being present in an amount from about 5 to about 50% by weight of the combined weight of said silica gel and said liquid; and
(2) a second layer, said second layer being adjacent to said first layer and comprising a combination of zeolite and activated carbon, said zeolite and activated carbon containing a liquid for inhibiting the growth of microorganisms, said liquid for inhibiting the growth of microorganisms, said liquid being present in an amount from about 5 to about 50% by weight of the combined weight of said zeolite, activated carbon and liquid;
said first and second layers being positioned between two layers containing material for removing particulate matter from the air, and said liquid of said first and second layers comprising:
(a) a fungicide/bacteriocide preservative composition in an amount from about 0.5 to 2% by weight of the liquid,
(b) at least one polyhydric alcohol, said polyhydric alcohol being present in an amount from about 83 to about 99.5% by weight of the liquid, and
(c) optionally, at least one compound for modifying the vapor pressure of said polyhydric alcohol, said compound being present in an amount of less than about 15% by weight of the liquid.

28. The air treatment filter of claim 27, wherein said two layers containing material for removing particulate matter comprise plastic foam.

29. The filter of claim 28, wherein said fungicide/bacteriocide preservative composition in said first layer and said second layer is captan, said captan being present in an amount of 1% by weight of the liquid, wherein said polyhydric alcohol in said first layer and said second layer is a combination of propylene glycol, said propylene glycol being present in an amount from about 74 to 89% by weight of the liquid, and glycerin, said glycerin being present in an amount from about 5 to 10% by weight of the liquid, wherein said additional compound in said first layer and said second layer is water, said water being present in an amount from about 5 to 15% by weight of the liquid, wherein said liquid in said first layer is present in an amount of about 50% by weight of the combined weight of said liquid and said silica gel, and wherein said liquid in said second layer is present in an amount of about 30% by weight of the combined weight of said said liquid, zeolite and activated carbon.

30. The filter of claim 29, wherein said plastic foam is polyurethane containing 20 pores per inch.

31. The air treatment filter of claim 30 wherein said zeolite is zeolite X.

32. An air treatment filter comprising:
(a) a structure for holding a filter element; and
(b) a filter element consisting essentially of:
(1) a first layer comprising plastic foam;
(2) a second layer adjacent said first layer comprising silica gel containing a liquid for inhibiting the growth of microorganisms, said liquid comprising
(i) a fungicide/bacteriocide preservative composition in an amount from about 0.5 to 2% by weight of the liquid,
(ii) at least one polyhydric alcohol, said polyhydric alcohol being present in an amount from about 83 to about 99.5% by weight of the liquid,
(iii) at least one compound for modifying the vapor pressure of said polyhydric alcohol, said compound being present in an amount of less than about 15% by weight of the liquid, and
(iv) a naringen-iron chelate produced from the reaction of naringen in an amount from about 0.1 to 0.2% by weight of the liquid with ferric chloride hydrate in an amount from about 0.01 to 0.10% by weight of the liquid, said liquid being present in an amount from about 5 to about 50% by weight of the combined weight of said silica gel and said liquid;
(3) a third layer adjacent said second layer comprising a combination of zeolite and activated carbon, said zeolite and activated carbon containing a liquid for inhibiting the growth of microorganisms, said liquid comprising
- (i) a fungicide/bacteriocide preservative composition in an amount from about 0.5 to 2% by weight of the liquid,
- (ii) at least one polyhydric alcohol, said polyhydric alcohol being present in an amount about 83 to 99.5% by weight of the liquid,
- (iii) at least one compound for modifying the vapor pressure of said polyhydric alcohol, said compound being present in an amount of less than about 15% by weight of the liquid, and
- (iv) a naringen-iron chelate produced from the reaction of naringen in an amount from about 0.1 to 0.2% by weight of the liquid with ferric chloride hydrate in any amount from about 0.01 to 0.10% by weight of the liquid, said liquid being present in an amount from about 5 to about 50% by weight of the combined weight of said zeolite, activated carbon and liquid, and
- (4) a fourth layer adjacent said third layer comprising plastic foam.

33. The filter of claim 32, wherein said plastic foam is polyurethane, wherein said fungicide/bacteriocide preservative composition in said second layer and said third layer is captan, said captan being present in an amount of about 1% by weight of said liquid, wherein said polyhydric alcohol in said second layer and said third layer is a combination of propylene glycol, said propylene glycol being present in an amount of about 80.5% by weight of said liquid, and glycerin, said glycerin being present in an amount of about 8.5% by weight of said liquid, wherein said at least one additional compound in said second layer and said third layer is water, said water being present in an amount of about 10% by weight of said liquid, wherein said naringin-iron chelate is produced from the reaction of naringin in an amount of 0.175% by weight of the liquid with ferric chloride hydrate in an amount of 0.05% by weight of the liquid, and further wherein said liquid in said second layer is present in an amount of about 50% by weight of the combined weight of said liquid and said silica gel and wherein said liquid in said third layer is present in an amount of about 30% by weight of the combined weight of said liquid, zeolite and activated carbon.

34. The filter of claim 33 wherein said polyurethane contains 20 pores per inch.

35. The air treatment filter of claim 34 wherein said zeolite is zeolite X.

36. The air treatment filter of claim 35 wherein said structure is plastic.

37. An air treatment filter comprising:
- (a) a structure for holding a filter element; and
- (b) a filter element consisting essentially of:
- (1) first and third layers comprising plastic foam, and
- (2) a second layer between said first and third layers comprising a combination of silica gel, zeolite and activated carbon, said silica gel, zeolite and activated carbon containing a liquid for inhibiting the growth of microorganisms, said liquid being present in an amount from about 5 to about 50% by weight of the combined weight of said silica gel, zeolite, activated carbon and liquid, said liquid comprising:
  - (i) a fungicide/bacteriocide preservation composition in an amount from 0.5 to 2% by weight of the liquid,
  - (ii) at least one polyhydric alcohol, said polyhydric alcohol being present in an amount from about 83 to 99.5% by weight of the liquid, and
  - (iii) at least one compound for modifying the vapor pressure of said polyhydric alcohol, said compound being present in an amount of less than about 15% by weight of the liquid.

38. The air treatment filter of claim 37 wherein said fungicide/bacteriocide preservative composition is captan, said captan being present in an amount of 1% by weight of said liquid, wherein said polyhydric alcohol is a combination of propylene glycol, said propylene glycol being present in amount of about 80.5% by weight of said liquid, and glycerin, said glycerin being present in amount of about 8.5% by weight of said liquid, wherein said additional compound is water, said water being present in amount of about 10% by weight of said liquid, and said liquid being present in amount of about 30% by weight of the combined weight of said silica gel, zeolite, activated carbon and liquid.

39. The filter of claim 38 wherein said foam is polyurethane containing 20 pores per inch.

40. The air treatment filter of claim 39, wherein said zeolite is zeolite X.

* * * * *